United States Patent
Takamoto

(10) Patent No.: US 8,025,597 B2
(45) Date of Patent: Sep. 27, 2011

(54) BICYCLE COMPONENT POSITION CORRECTING DEVICE

(75) Inventor: Ryuichiro Takamoto, Osaka (JP)

(73) Assignee: Shimano Inc., Osaka (JP)

( * ) Notice: Subject to any disclaimer, the term of this patent is extended or adjusted under 35 U.S.C. 154(b) by 748 days.

(21) Appl. No.: 12/034,177

(22) Filed: Feb. 20, 2008

(65) Prior Publication Data

US 2009/0209375 A1 Aug. 20, 2009

(51) Int. Cl.
*F16H 61/02* (2006.01)

(52) U.S. Cl. .............. 474/70; 474/80; 474/82

(58) Field of Classification Search ............ 474/69, 474/70, 78–82; 74/866, 500.5, 502.2; 701/51; 280/236, 238
See application file for complete search history.

(56) References Cited

U.S. PATENT DOCUMENTS

| | | | |
|---|---|---|---|
| 5,266,065 A * | 11/1993 | Ancarani Restelli | 474/78 |
| 5,653,649 A | 8/1997 | Watarai | |
| 6,418,368 B2 | 7/2002 | Jinbo et al. | |
| 6,634,971 B2 * | 10/2003 | Campagnolo | 474/78 |
| 6,945,888 B2 | 9/2005 | Fukuda et al. | |
| 7,100,471 B2 | 9/2006 | Irie et al. | |
| 7,116,008 B2 | 10/2006 | Kitamura et al. | |
| 7,207,911 B2 * | 4/2007 | Campagnolo et al. | 474/78 |
| 7,247,108 B2 | 7/2007 | Takeda | |
| 7,306,531 B2 | 12/2007 | Ichida et al. | |
| 7,805,268 B2 * | 9/2010 | Takamoto | 474/116 |
| 2005/0233849 A1 * | 10/2005 | Campagnolo et al. | 474/80 |
| 2005/0255950 A1 * | 11/2005 | Takebayashi et al. | 474/70 |
| 2009/0098963 A1 | 4/2009 | Watarai et al. | |

FOREIGN PATENT DOCUMENTS

| | | |
|---|---|---|
| JP | A-2001-200930 A | 7/2001 |
| JP | A-2004-168301 A | 6/2004 |
| JP | A-2004-352227 A | 12/2004 |

OTHER PUBLICATIONS

Japanese Office Action issed on Jan. 18, 2011 corresponding Japanese Application No. JP-A-2009-035016.

* cited by examiner

*Primary Examiner* — William A Rivera
(74) *Attorney, Agent, or Firm* — Global IP Counselors, LLP

(57) ABSTRACT

A bicycle component position correcting device is basically provided with a first sensor, a second sensor, a comparison unit and a position adjuster. The first sensor detects a current absolute value of a positioning angle of a movable part of a bicycle component. The second sensor detects both a movement direction of the movable part and an amount of movement of the movable part. The comparison unit compares the current absolute value of the positioning angle of the movable part to a prestored reference value of the positioning angle of the movable part in response to a component operation command. The position adjuster selectively outputs an adjustment command to the movable part that adjusts the absolute value of the positioning angle of the movable part in accordance with both detected results of the first and second sensors.

14 Claims, 13 Drawing Sheets

| Gear Position | Analog Position Memory | Digital Position Memory |
|---|---|---|
| 1 | A | a |
| 2 | B | b |
| 3 | C | c |
| 4 | D | d |
| 5 | E | e |
| 6 | F | f |
| 7 | G | g |

FIG. 8

| Gear Position | Analog Position Memory | Digital Position Memory |
|---|---|---|
| 1 | A' | a |
| 2 | B' | b |
| 3 | C' | c |
| 4 | D' | d |
| 5 | E' | e |
| 6 | F' | f |
| 7 | G' | g |

FIG. 9

BICYCLE COMPONENT POSITION CORRECTING DEVICE

BACKGROUND OF THE INVENTION

1. Field of the Invention

This invention generally relates to a bicycle component position correcting device. More specifically, the present invention relates to a bicycle component position correcting device for correcting a position of electrical controlled bicycle component.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, the bicycle transmission has been significantly changed over the years.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleur transmissions were manually controlled by a hand operated actuator such as a lever or twist-grip attached to the bicycle handlebar, wherein the derailleur is connected to the actuator by a Bowden cable.

Recently, bicycles have been equipped with electrical components to make riding easier and more enjoyable for the rider. Some bicycles are equipped with electrically controlled shifting systems. In particular, in theses electrically controlled shifting systems, the front and rear derailleurs are provided with motors that move the chain guide to obtain the various gear positions. A common operating parameter is the position of the derailleur relative to the plurality of sprockets. In the past, potentiometers that cooperated with various moving components of the derailleur were used to ascertain the position of the derailleur. Since derailleurs usually have a relatively small range of motion, high precision potentiometers were required for this purpose. That was especially true when the information provided by the potentiometer is used by an electronic device to shift the chain among the plurality of sprockets. Unfortunately, high precision potentiometers are relatively expensive, thus making electronically controlled derailleurs using high precision potentiometers unsuitable for mass production. Inexpensive potentiometers have nonlinear characteristics, and such characteristics vary from one potentiometer to another. Thus, the actual derailleur position is difficult to ascertain with such potentiometers, and the unpredictability from one potentiometer to another also makes derailleurs using such potentiometers unsuitable for mass production. Some examples of electrical controlled bicycle derailleurs are disclosed in U.S. Pat. No. 6,945,888 to Fukuda et al. (assigned to Shimano Inc.) and U.S. Pat. No. 7,306,531 to Ichida et al. (assigned to Shimano Inc.). In these conventional electrically controlled bicycle derailleurs, an analog position sensor and a digital position sensor are used to control the shift position of the derailleur.

In particular, in U.S. Pat. No. 7,306,531, the electrical controlled bicycle derailleur uses an analog position sensor formed by a potentiometer in order to detect a position of the an output shaft of a motor drive train of a motor, and a digital position sensor formed by a shutter wheel and a photo interrupter in order to detect both the rotational direction and the angular position of the output shaft of the motor drive train of the motor.

In generally, with the electrical controlled bicycle derailleur disclosed in U.S. Pat. No. 7,306,531, the analog sensor functions only during a calibration mode in order to detect a top or a low end gear ranges. At each shifting operations, the digital sensor only functions. So, sometimes the derailleur may be out of alignment by hitting something. Since these sensors would not detect if an absolute value of starting or stopping position of the motor is correct or incorrect during shifting, the shifting position can be incorrect.

In view of the above, it will be apparent to those skilled in the art from this disclosure that there exists a need for an improved bicycle derailleur position adjusting device. This invention addresses this need in the art as well as other needs, which will become apparent to those skilled in the art from this disclosure.

SUMMARY OF THE INVENTION

One object of the present invention is to provide a bicycle component position adjusting device that will correct a bicycle component position in response to a component operation.

The foregoing object can basically be attained by providing a bicycle component position correcting device that comprises a first sensor, a second sensor, a comparison unit and a position adjuster. The first sensor is configured and arranged to detect a current absolute value of a positioning angle of a movable part of a bicycle component. The second sensor is configured and arranged to detect both a movement direction of the movable part and an amount of movement of the movable part. The comparison unit is configured and arranged to compare the current absolute value of the positioning angle of the movable part to a prestored reference value of the positioning angle of the movable part in response to a component operation command. The position adjuster is configured and arranged to selectively output an adjustment command to the movable part that adjusts the absolute value of the positioning angle of the movable part in accordance with both detected results of the first and second sensors.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a table illustrating one example of initial values stored in the memory of the controller at the factory;

FIG. 9 is a table illustrating one example of updated values stored in the memory of the controller after calibration by the rider;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
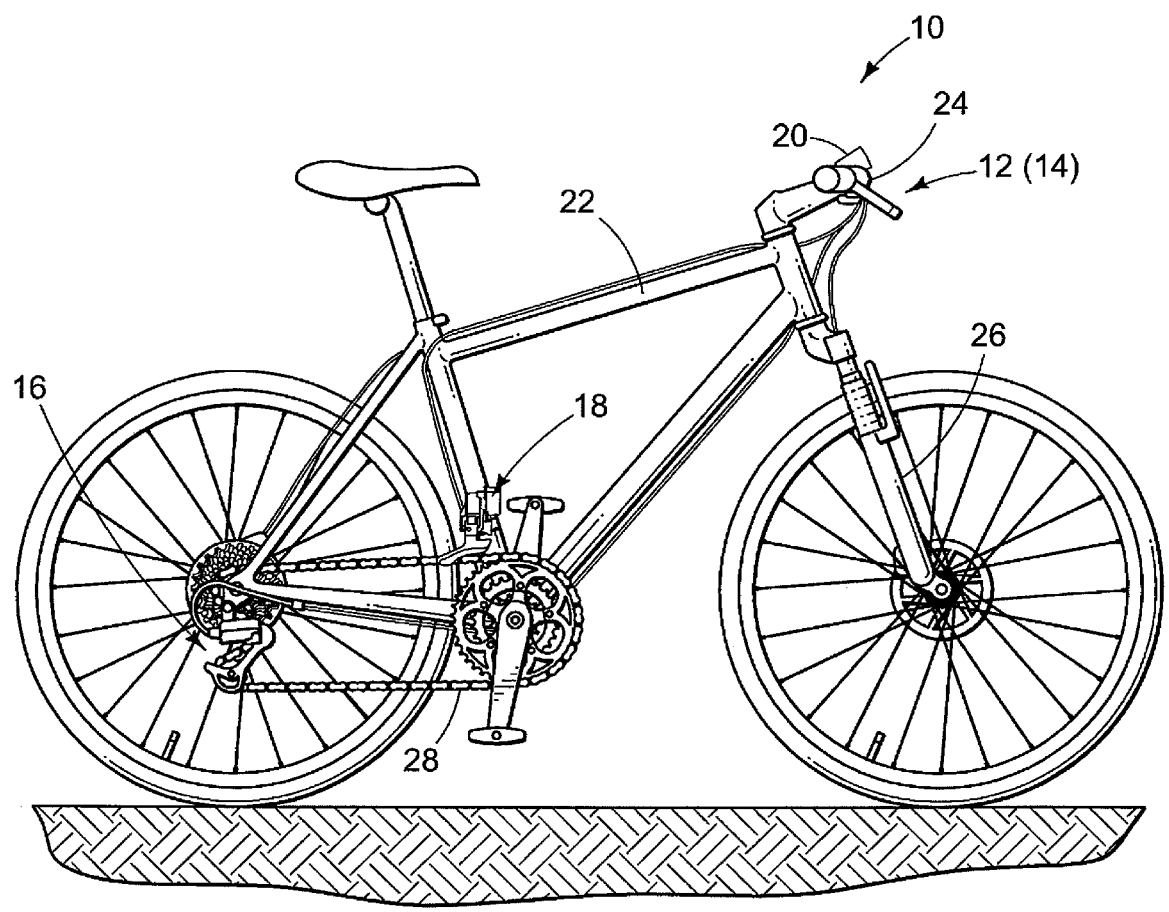
FIG. 1 is a side elevational view of a bicycle (mountain bike) that is equipped with motorized front and rear derailleurs and a pair of control devices in accordance with a first embodiment.
Figure 2:
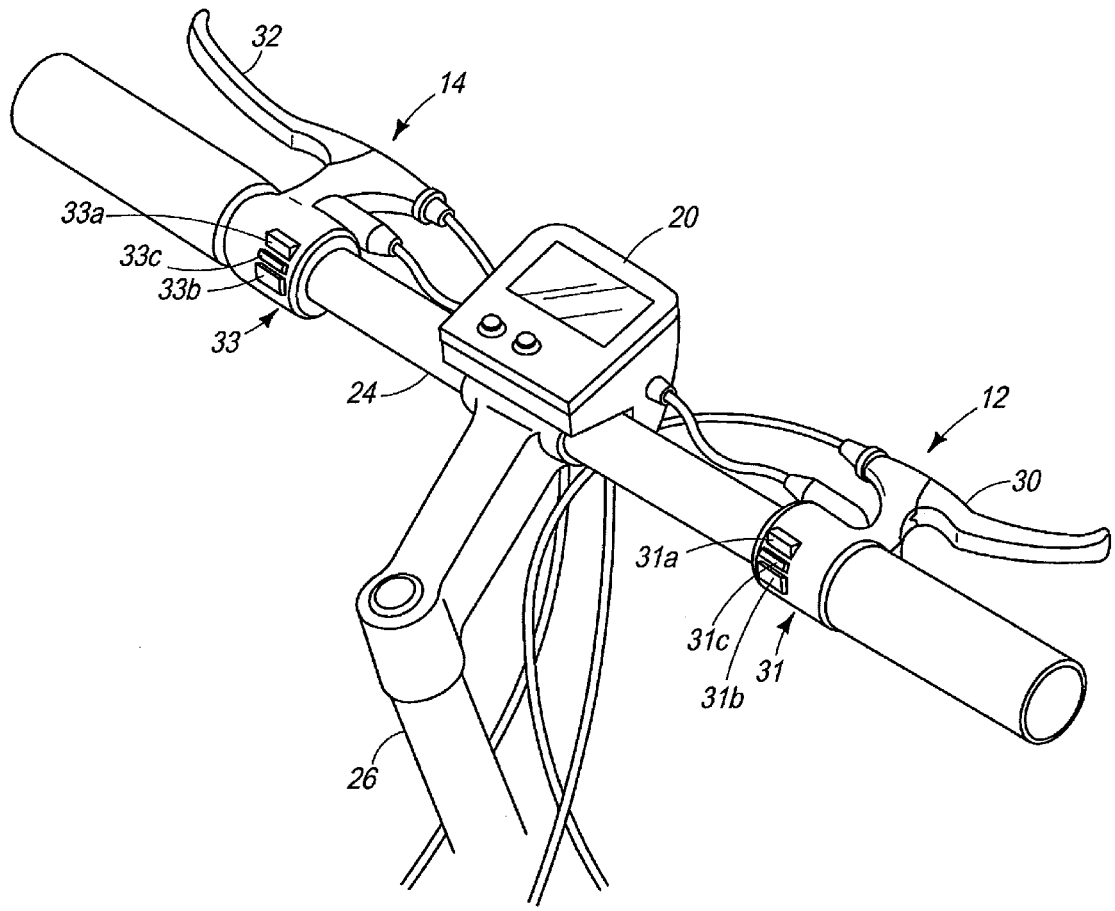
FIG. 2 is a perspective view of the handlebar area of the bicycle illustrated in FIG. 1, with the control devices mounted to a straight type of handlebar in accordance with the first embodiment.

Referring initially to FIG. 1, a bicycle 10 is illustrated that is equipped with an electronic shifting system in accordance with a first embodiment in accordance with a first embodiment of the present invention. As seen in FIGS. 1 and 2, the electronic shifting system basically includes a right hand side control device 12, a left hand side control device 14, a motorized rear derailleur 16, a motorized front derailleur 18 and an electronic controller 20. Other than the electronic shifting system, as explained below, the bicycle 10 can be any type of bicycle. Thus, the parts of the bicycle 10 will not be discussed herein, except for those parts that will assist in the understating of the electronic shifting system.

The bicycle 10 is a mountain bike for off-road use. The bicycle 10 basically includes, among other parts, a frame 22, a handlebar 24 and a front fork 26. The handlebar 24 is mounted to an upper end of the front fork 26 in a conventional manner. The handlebar 24 has the control devices 12 and 14 mounted to opposite ends. The rear derailleur 16 is mounted to a rear portion of a chain stay of the frame 22 in a conventional manner. The front derailleur 18 is mounted on a seat tube of the frame 22 in a conventional manner.

Figure 3:
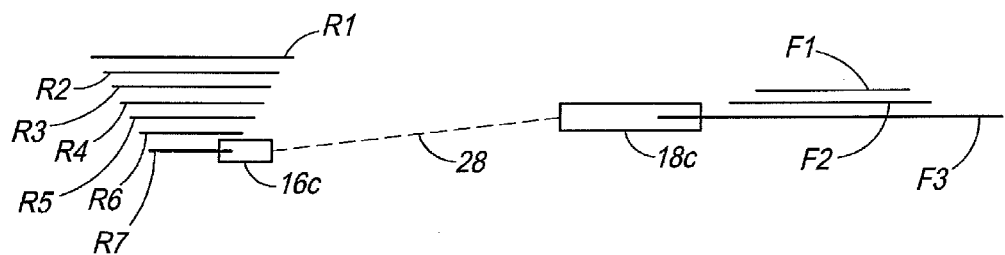
FIG. 3 is a schematic diagram showing one example of an arrangement of front and rear sprockets of the bicycle illustrated in FIG. 1.

As diagrammatically illustrated in FIG. 3, the bicycle 10 also includes a drive train having a set of rear sprockets R1 to R7 mounted to the rear axle of the rear wheel in a conventional manner, and a set of front sprockets F1 to F3 mounted to the crank axle in a conventional manner, with a chain 28 operatively coupled between the rear sprockets R1 to R7 and the front sprockets F1 to F3 in a conventional manner. The control devices 12 and 14 are operated by the rider in order to control movement (e.g., perform gear shifting operations) of the rear and front derailleurs 16 and 18 with respect to the rear sprockets R1 to R7 and the front sprockets F1 to F3, respectively.

The bicycle control device 12 is preferably mounted on the right side of handlebar 24, while the bicycle control device 12 is preferably mounted on the left side of handlebar 24. The bicycle control devices 12 and 14 are essentially identical in construction and operation, except that they are mirror images. The bicycle control device 12 preferably includes a rear brake lever 30 and a rear electronic shifter 31, while the bicycle control device 14 preferably includes a front brake lever 32 and a front electronic shifter 33. The rear brake lever 30 is connected to a Bowden-type control cable that is connected to a rear disc brake (not shown). Similarly, the front brake lever 30 is connected to a Bowden-type control cable that is connected to a front disc brake (not shown).

Referring back to FIG. 2, the rear electronic shifter 31 is preferably provided with a rear derailleur downshift switch 31a, a rear derailleur upshift switch 31b and a rear derailleur mode switch 31c. These switches 31a to 31c are push button type switches that are operatively coupled to the electronic controller 20, which is a cycle computer that preferably includes other functions as needed and/or desired. The switches 31a and 31b constitute an input part for inputting gear shift commands and calibration commands, while switch 31c constitutes an input part for inputting mode commands. The rear derailleur downshift switch 31a is normally used for downshifting the rear derailleur 16, while the rear derailleur upshift switch 31b is normally used for upshifting the rear derailleur 16. The rear derailleur mode switch 31c is used to change the switches 31a and 31b from a shifting mode to other modes including, but not limited to, a calibration mode for calibrating the gear positions of the rear derailleur 16.

Similarly, as illustrated in FIG. 2, the front electronic shifter 33 is preferably provided with a front derailleur downshift switch 33a, a front derailleur upshift switch 33b and a front derailleur mode switch 33c. These switches 33a to 33c are push button type switches that are operatively coupled to the cycle computer 20. The switches 33a and 33b constitute an input part for inputting gear shift commands and calibration commands, while switch 33c constitutes an input part for inputting mode commands. The front derailleur downshift switch 33a is normally used for downshifting the rear derailleur 16, while the front derailleur upshift switch 33b is normally used for upshifting the rear derailleur 16. The front derailleur mode switch 33c is used to change the switches 33a and 33b from a shifting mode to other modes including, but not limited to, a calibration mode for calibrating the gear positions of the front derailleur 18.

Figure 4:
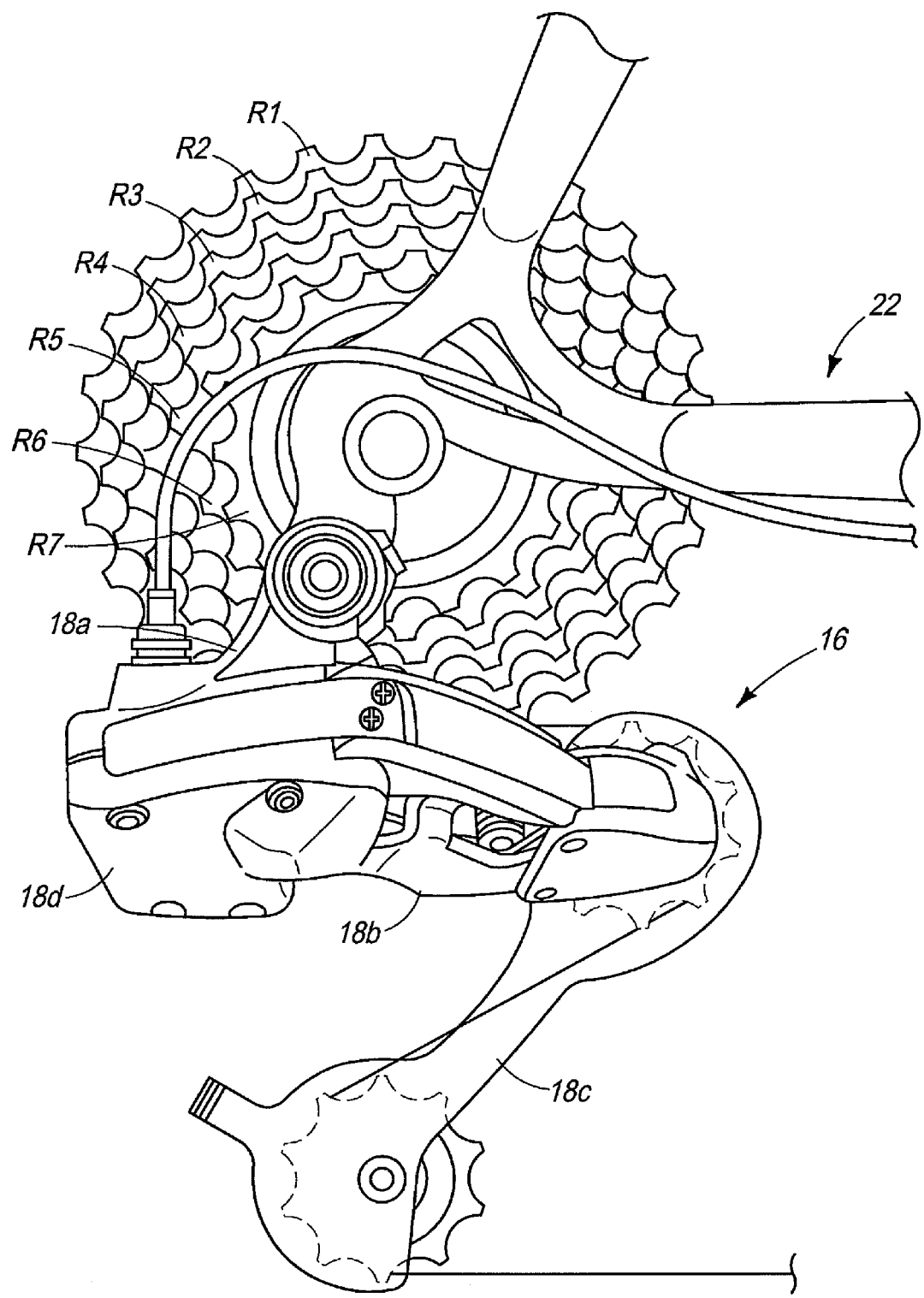
FIG. 4 is an enlarged side elevational view of the motorized rear derailleur illustrated in FIG. 1.

As seen in FIG. 4, the rear derailleur 16 is configured such that it can be controlled electrically. The rear derailleur 16 basically includes a mounting (fixed) member 16a, a movable member 16b, a four-point linkage (connecting) mechanism 16c and a chain guide 16d. Motorized derailleurs such as the rear derailleur 16 are well known in the art, and thus, the rear derailleur 16 will not described or illustrated in detail herein. Moreover, practically any electrically controlled rear derailleur can be used.

Basically, the mounting member 16a is fastened to the rear portion of the chain stay of the frame 22 in a conventional manner by a bolt 34. The four-point linkage (connecting) mechanism 16c has two links with first ends of the links pivotally connected to the mounting member 16a and second ends pivotally connected to the movable member 16b. Thus, the four-point linkage mechanism 16c is arranged to movably connect the chain guide 16b to the mounting member 16a. The chain guide 16d has a chain cage with two pulleys for receiving the chain 28. The chain cage of the chain guide 16d is also pivotally connected to the movable member 16b. The mounting member 16a includes an electric drive or motor unit 36 that is operatively coupled to the four-point linkage (connecting) mechanism 16c for moving the movable member 16b laterally with respect to the frame 22. This lateral movement of the movable member 16b also moves the chain guide 16d laterally with respect to the frame 22 so that the chain 28 can be selectively shifted from one of the rear sprockets R1 to R7 to the next. As diagrammatically illustrated in FIG. 3, the chain guide 16d is configured to be moved to one of the rear sprockets R1 to R7 in response to a gear shifting operation of the control device 12 so that the chain 28 is moved onto the corresponding sprocket of the rear sprockets R1 to R7.

Figure 5:
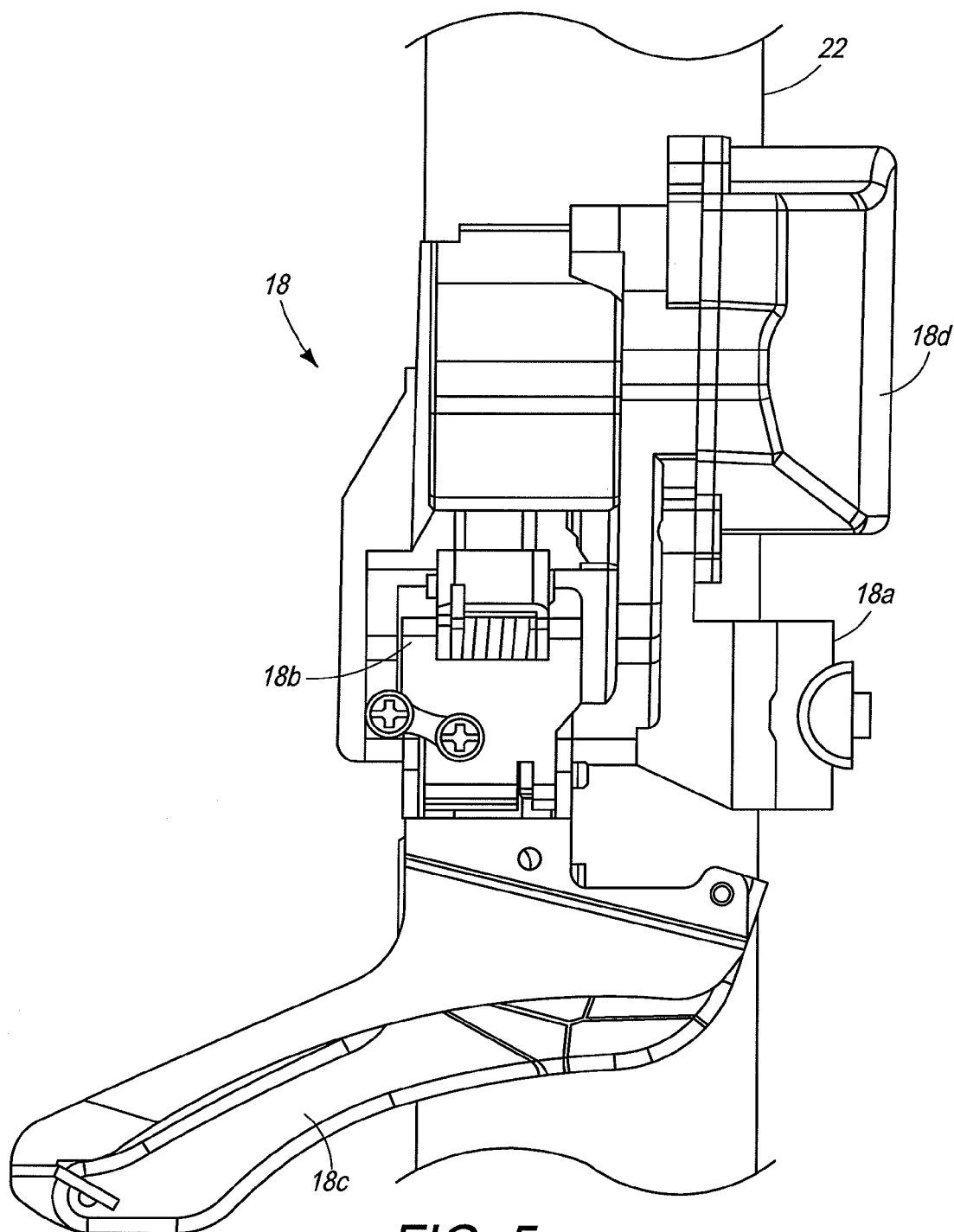
FIG. 5 is an enlarged side elevational view of the motorized front derailleur illustrated in FIG. 1.

As seen in FIG. 5, the front derailleur 18 is configured such that it can be controlled electrically. The front derailleur 18 basically includes a mounting (fixed) member 18a, a movable member 18b, a four-point linkage (connecting) mechanism 18c and a chain guide 18d. Motorized derailleurs such as the front derailleur 18 are well known in the art, and thus, the front derailleur 18 will not described or illustrated in detail herein. Moreover, practically any electrically controlled front derailleur can be used.

Basically, the mounting member 18a is fastened to the seat tube of the frame 22 in a conventional manner by a bolt 35. The four-point linkage (connecting) mechanism 18c has two links with first ends of the links pivotally connected to the mounting member 18a and second ends pivotally connected to the movable member 18b. Thus, the four-point linkage mechanism 18c is arranged to movably connect the chain guide 18b to the mounting member 18a. The chain guide 18d has a chain cage for receiving the chain 28. The mounting member 18a includes an electric drive or motor unit 38 that is operatively coupled to the four-point linkage (connecting) mechanism 18c for moving the movable member 18b laterally with respect to the frame 22. This lateral movement of the movable member 18b also moves the chain guide 18d laterally with respect to the frame 22 so that the chain 28 can be selectively shifted from one of the front sprockets F1 to F3 to the next. As diagrammatically illustrated in FIG. 3, the chain guide 18d is configured to be moved to one of the front sprockets F1 to F3 in response to a gear shifting operation of the control device 12 so that the chain 28 is moved onto the corresponding sprocket of the front sprockets F1 to F3.

Figure 6:
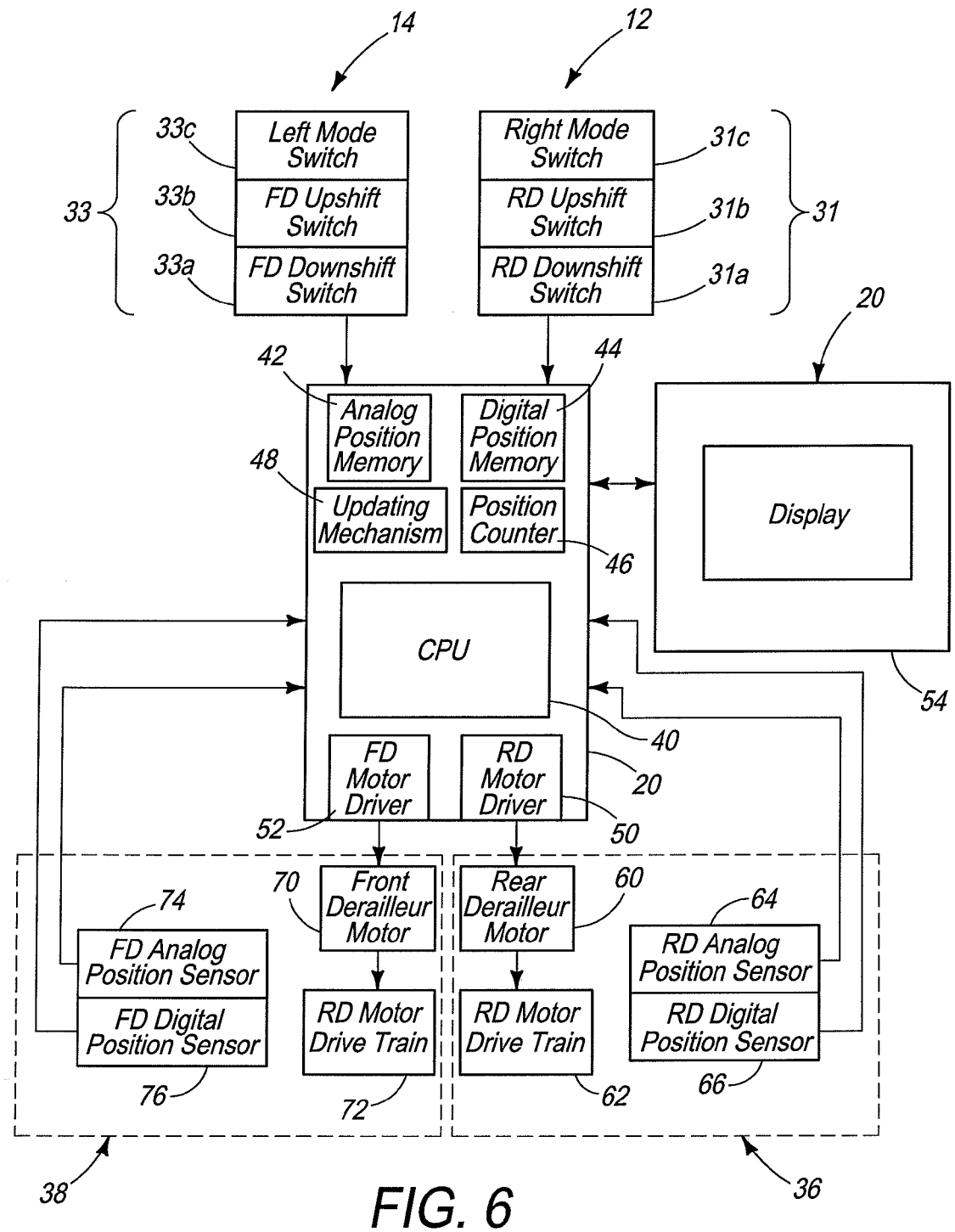
FIG. 6 is a block diagram of the electronic shifting system of the bicycle illustrated in FIG. 1 in accordance with the first embodiment.

Turning now to FIG. 6, the electronic shifting system is schematically illustrated as a block diagram to more easily understand the interrelationship of the parts. The electronic controller 20 is a processing mechanism that preferably includes a microcomputer 40 with a calibration control program for calibrating the positions of the chain guides 16d and 18d of the rear and front derailleurs 16 and 18 and a position correction program for correcting the positions of the chain guides 16d and 18d of the rear and front derailleurs 16 and 18. The electronic controller 20 can also include other conventional components such as an input interface circuit, an output interface circuit, and storage devices such as a ROM (Read Only Memory) device and a RAM (Random Access Memory) device. The internal RAM of the electronic controller 20 stores statuses of operational flags and various control data. The internal ROM of the electronic controller 20 stores the predetermined parameter for various shifting operations. In this first embodiment the controller 20 is separate from the control devices 12 and 14.

The electronic controller 20 also preferably includes an analog position memory 42, a digital position memory 44, a position counter 46; an updating mechanism 48, a rear derailleur motor driver 50, a front derailleur motor driver 52, and a display 54. The microcomputer 40 of the electronic controller 20 constitutes a comparison unit for comparing detected values with prestored reference values and a position adjuster for adjusting the positions of the chain guides 16d and 18d of the derailleurs 16 and 18 as explained below. The analog position memory 42 stores a plurality of analog position values. The digital position memory 44 stores a plurality of digital position values, a position counter 46. The analog position memory 42 and the digital position memory 44 constitute a storage part with at least one prestored reference value for a derailleur (component) position. The updating mechanism 48 updates at least one of the analog position memory 42 and the digital position memory 44. The updating mechanism 48 constitutes a reference value updating part that is configured to update the prestored reference value for the derailleur (component) position to an updated reference value based on the adjusted or corrected position. The rear derailleur motor driver 50 provides signals for moving the rear derailleur 16. The front derailleur motor driver 53 provides signals for moving the front derailleur 18.

Also, hardware and/or software of the controller 20 can divided into a command detecting and setting part and a component moving command part. The command detecting and setting part includes the hardware and/or software of the controller 20 that is configured to detect a calibration command and to set a selected adjustment amount and a selected adjustment direction for the calibration command that was detected. The component moving command part includes the hardware and/or software of the controller 20 that is configured to issue a movement command to initially move the derailleur (bicycle component) farther than the selected adjustment amount in a first direction by an adjustment indicating amount in response to the calibration command, and then subsequently move the derailleur (bicycle component) in a second direction to the selected adjustment position in which the second direction is opposite to the first direction and the adjustment indicating amount is greater than the selected adjustment amount. As explained below, the hardware and/or software of the controller 20 that forms the component moving command part is further configured to issue the movement command such that the first direction and the selected adjustment direction are same direction.

As explained below, the hardware and/or software of the controller 20 that forms the command detecting and setting part is further configured to detect a number of operations of the switch 31a, 31b, 33a, or 33b (input part) within a prescribed time period P1 and to set the selected adjustment amount based a number of times that the switch 31a, 31b, 33a, or 33b (input part) was operated within the prescribed time period P1. Also the hardware and/or software of the controller 20 that forms the component moving command part is further configured to issue the movement command such that the derailleur (bicycle component) is moved different amounts for the selected adjustment position depending on the number of times that the switch 31a, 31b, 33a, or 33b (input part) was operated within the prescribed time period P1.

Still referring to FIG. 6, the motor unit 36 of the rear derailleur 16 basically includes a rear derailleur motor 60, a rear derailleur motor drive train 62, a rear derailleur analog position sensor 64 and a rear derailleur digital position sensor 66. The rear derailleur analog position sensor 64 and the rear derailleur digital position sensor that form a rear derailleur position control mechanism.

Similarly, the motor unit 38 of the front derailleur 18 includes a rear derailleur motor 70, a rear derailleur motor drive train 72, a front derailleur analog position sensor 74 and a rear derailleur digital position sensor 76. The front derailleur analog position sensor 74 and the rear derailleur digital position sensor 76 form a front derailleur position control mechanism.

The analog position sensors 64 and 74 each form a mechanical/electrical position sensing device for detecting a current absolute value of positioning angle (rotational) angle of at least one of the movable parts of the motor (electric drive) units 36 and 38, respectively. The digital position sensors 66 and 76 each form a digital position sensing device for detecting both a movement (rotational) direction of the movable parts of the motor unit 36 and 38, respectively, and an amount of rotational movement of at least one of the movable parts of the motor unit 36 and 38, respectively.

The microcomputer 23 receives signals from the sensors 64 and 66 for determining the gear position and the driving amount of the rear derailleurs 16 during calibration and/or shifting. Thus, the signals from the sensors 64 and 66 are used by the rear derailleur motor driver 50 to drive the rear derailleur motor 60 for moving the rear derailleur 16 via the rear derailleur motor drive train 62. Similarly, the microcomputer 23 receives signals from the sensors 74 and 76 for determining the gear position and the driving amount of the front derailleurs 18 during calibration and/or shifting. Thus, the signals from the sensors 74 and 76 are used by the front derailleur motor driver 52 to drive the front derailleur motor 70 for moving the front derailleur 18 via the front derailleur motor drive train 72.

The controller 20 cooperates together with the sensors 64, 66, 74 and 76 to constitute a bicycle component position correcting device in which the microprocessor 40 acting as a comparison unit compares the current absolute value of the positioning angle of the motor drive trains 62 and 72 (movable parts) to a prestored reference value of the positioning angle of the motor drive trains 62 and 72 (movable parts) in response to a derailleur gear shift command. Also the microprocessor 40 acting as a position adjuster selectively output an adjustment command to the motor drive trains 62 and 72 (movable parts) that adjusts the absolute value of the positioning angle of the motor drive trains 62 and 72 (movable parts) in accordance with both detected results of the sensors 64, 66, 74 and 76.

Figure 7:
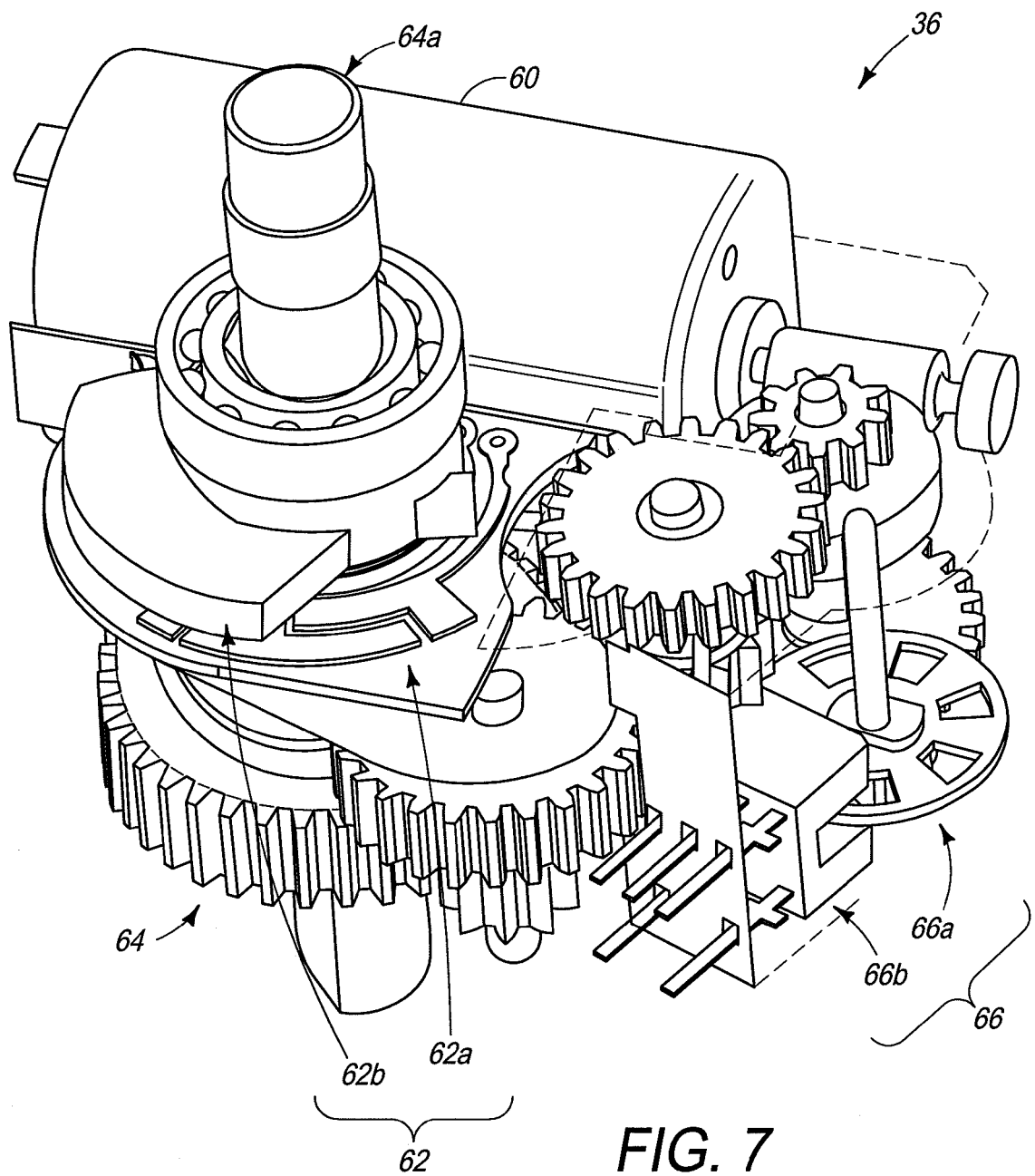
FIG. 7 is a simplified perspective view of the motor unit of the motorized rear derailleur illustrated in FIG. 4.

Turning now to FIG. 7, an exemplary structure for the motor unit 36 of the rear derailleur 16 will be briefly explained. In this illustrated embodiment, the rear derailleur motor 60 is preferably a reversible electrical motor. The rear derailleur motor 60 is electrically coupled to the controller 20 and to a power source (battery source or a generator) by electrical cords in a conventional manner. The rear derailleur motor drive train 62 basically includes a plurality of gears with the gears being operatively coupled to a driving shaft 60a of the rear derailleur motor 60 to transmit rotational movement to one of the links of the linkage (connecting) mechanism 16c by an output shaft 62a.

The rear derailleur analog position sensor 64 is preferably a potentiometer that includes a stationary electrical contact plate 64a and a movable electrical brush plate 64b. The stationary electrical contact plate 64a includes one or more stationary electrical contacts that are mounted on the printed circuit board, while the movable electrical brush plate 64b includes one or more movable electrical brushes that are mounted on the printed circuit board. The movable electrical brush plate 64b is mounted on the output shaft 62a to rotate therewith such that the one or more movable electrical brushes slides along the stationary electrical contacts of the stationary electrical contact plate 64a when the output shaft 62a is rotated in response to operation of the rear derailleur motor 60. The rear derailleur analog position sensor (potentiometer) 64 outputs an analog or mechanical signal that is sent to the controller 20 to indicate the current position of the rear derailleur motor drive train 62 of the motor unit 36 of the rear derailleur 16. Since the output shaft 62a of the rear derailleur motor drive train 62 is connected to one of the links of the linkage (connecting) mechanism 16c, the position of the chain cage 16d can be determined based on the output signals from the rear derailleur analog position sensor 64.

The rear derailleur digital position sensor 66 is formed by a position sensor element or shutter wheel 66a and a photo interrupter 66b. The a photo interrupter 66b is preferably a dual channel photo interrupter having a light source or LED disposed on one side of the shutter wheel 66a and a light detector such as a phototransistor disposed on the other side of the shutter wheel 66a. The shutter wheel 66a is operatively connected to the rear derailleur motor drive train 62 of the motor unit 36 so that the shutter wheel 66a rotates when the rear derailleur motor drive train 62 is rotated in response to operation of the rear derailleur motor 60. This rotation of the shutter wheel 66a by the rear derailleur motor 60 causes the passage of light of LED to phototransistor to be intermittently blocked, thus producing a digital signal having a period determined by the rate of rotation of the shutter wheel 66a. Thus, the shape of the digital signal typically will have square or rectangular saw tooth configuration with each of the pulses representing one of a plurality of angular positions of the output shaft 62a. Since the photo interrupter 66b has two channels, the two digital signals will be produced by the photo interrupter 66b that are out of phase with each other. Thus, the digital position sensor 66 functions as an intermittent optical sensor that can detect both the rotational direction and the angular position of the output shaft 62a of the rear derailleur motor drive train 62 of the rear derailleur motor 60. The digital position sensor 66 sends a position signal indicative of an angular position and rotational direction of the output shaft 62a to the controller 20.

The rear derailleur analog position sensor 64 acting as a potentiometer is suitable for detecting an absolute value of positioning angle (positioning) of the rear derailleur motor drive train 62 of the rear derailleur motor 60 when the rear derailleur motor drive train 62 stops rotating (stationary). In the other hand, the photo interrupter of the rear derailleur digital position sensor 66 is suitable for detecting a value of rotating and a rotating direction. By using two types of sensors 64 and 66, it is possible to control maintain a correct and stable gear shifting position for the rear derailleur 16. Moreover, it is also easy to adjust an incorrect gear shifting position to correct gear shifting position as explained below.

Preferably, these sensors 64, 66, 74 and 76 are usually in a power-off state to save energy. However, when a shifting signal is inputted, the sensors 64, 66, 74 and 76 switch to a power-on state so as to detect the position of the derailleur motor drive train using the corresponding analog position sensor, and detect the rotation amount and rotation direction of the derailleur motor drive train using the corresponding digital position sensor. In the other words, at every shifting, the sensors 64, 66, 74 and 76 can detect the position, the movement amount, and the movement direction of the corresponding motor drive train. Further, when a shifting signal is not inputted, the sensors 64, 66, 74 and 76 would be inactive to save power. In the illustrated embodiment, the potentiometer of the analog position sensors 64 and 74 each detect an absolute value of position of the derailleur (e.g., the positioning angle of the motor drive train) at starting position, when a shifting signal is inputted.

The detailed structure of the motor unit 38 of the front derailleur 18 will not be explained herein for the sake of brevity. Basically, the motor unit 38 of the front derailleur 18 is similar to the motor unit 36 of the rear derailleur 16, but for that it has been adapted to a front derailleur. Accordingly, the front derailleur motor 70 is preferably a reversible electrical motor that drives the front derailleur motor drive train 72 to move one of the links of the linkage (connecting) mechanism 18c similar to the rear derailleur motor drive train 62. Also the front derailleur analog position sensor 74 is preferably a potentiometer such as like the one shown in FIG. 7, while the digital position sensor 76 preferably includes a position sensor element or shutter wheel and a photo interrupter such as like the one shown in FIG. 7. The signals from the sensors 74 and 76 are sent to the controller 20 to indicate the current position of the front derailleur motor drive train 72 of the front derailleur 18 in the same manner as in the rear derailleur motor drive train 62 of the rear derailleur 16.

Figure 10:
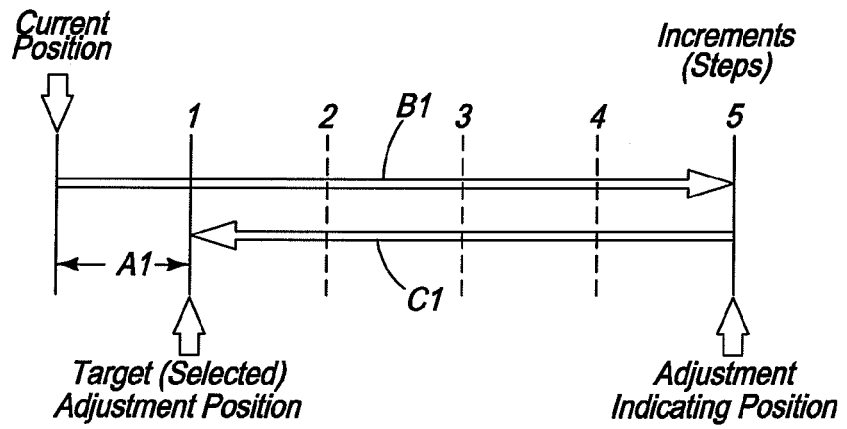
FIG. 10 is a diagram illustrating one example of a calibration method that shows the movement sequence of the derailleur during calibration.
Figure 11:
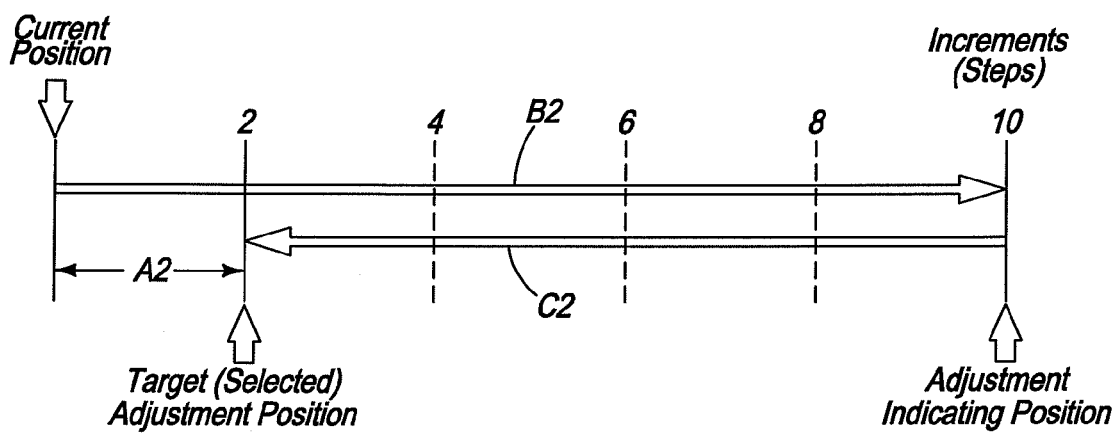
FIG. 11 is a diagram illustrating another example of a calibration method that shows the movement sequence of the derailleur during calibration.

Turning now to FIGS. 8 to 14, a derailleur calibration method and a derailleur position correcting method will now be discussed mainly with respect to the rear derailleur 16. Of course, it will be apparent to those skilled in the art from this disclosure that the derailleur calibration method and the derailleur position correcting method also are used with the front derailleur 18. As seen in FIGS. 10 and 11, with this derailleur calibration method, the user can easily determine if an adjustment was made and/or the direction of the adjustment by driving the derailleur motor 60 or 70 for a longer period of time so that the user can see the chain guide 16d or 18d move and its direction of movement.

As seen in FIG. 8, when the electronic shifting system is shipped from the factory, the controller 20 has at least one initial (factory setting) table prestored in the analog position memory 42 and the digital position memory 44 for each gear for a particular rear sprocket set and a particular derailleur. In particular, the initial (factory setting) table includes reference values to determine an energizing amount for operating the rear derailleur motor 60 to perform a shifting operation using detection signals from the sensors 64 and 66. In other words, the table contains absolute values of the positions of the derailleur, with the absolute values in the table corresponding to a value of a count of the potentiometer (0 to 250). The initial (factory setting) table is adjustable during the derailleur calibration mode to change the reference values (motor drive train stopping positions) corresponding to the gearing positions as seen in FIG. 9.

When calibrating the rear derailleur 16, the rear derailleur mode switch 31c is depressed once to change the switches 31a and 31b from a shifting mode to the calibration mode for calibrating the gear positions of the rear derailleur 16. Now, the rear derailleur downshift switch 31a can be used to adjust the stopping positions of the rear derailleur motor drive train 62 for adjusting the gear shifting positions of the chain guide 16d in a first direction, while the rear derailleur downshift switch 31b can be used to adjust the stopping positions of the rear derailleur motor drive train 62 for adjusting the gear shifting positions of the chain guide 16d in a second direction that is opposite the first direction. Preferably, when in the calibration mode, the rear derailleur downshift switch 31a adjusts the gear shifting positions of the chain guide 16d in a downshifting direction as the first direction, and the rear derailleur upshift switch 31b adjusts the gear shifting positions of the chain guide 16d in an upshifting direction as the second direction.

In the illustrated embodiment, the position adjusting part of the electronic controller 20 has total twenty-five adjusting steps (±12 steps from the initial reference value 0). In the calibration mode, each time one of the switches 31a or 31b is depressed, the motor 60 is operated to adjust the current position of the rear derailleur 16 by one step. If the one of the switches 31a or 31b is depressed twice in a prescribed time period P1 (e.g., one second), then the motor 60 is operated to adjust the current position of the rear derailleur 16 by two steps. After the position of the rear derailleur 16 is adjusted using the rear derailleur motor 60, the analog position sensor 64 senses the adjusted position of the rear derailleur motor drive train 62. The sensed adjusted position data are re-write (re-stored, re-set) in the table as seen in FIG. 9.

Preferably, in the illustrated embodiment, the rear derailleur 16 can be adjusted when in any one of its gear positions. In particular, all of shifting widths between gear positions and the next gear position are fixed in advance (i.e., pre-determined, pre-installed or pre-stored) in the digital position memory 44 of the tables shown in FIGS. 8 and 9. For example, if user adjusts the position of derailleur at the third speed position, other all speed positions (e.g., first, second and fourth to seventh speeds positions) are automatically adjusted based on the new adjusted third speed position and the pre-determined shifting widths that are stored in advance in the digital position memory 44.

Figure 12:
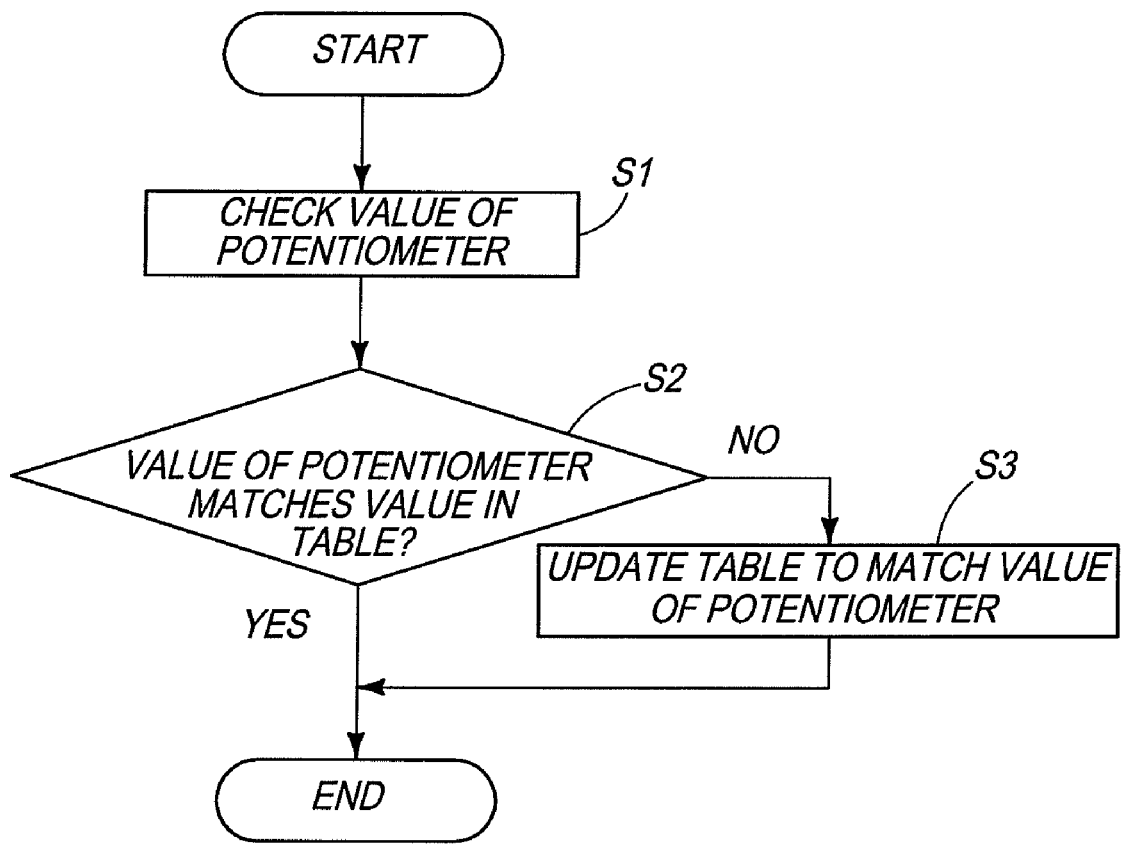
FIG. 12 is a flow chart illustrating the process executed by the controller after calibrating the derailleur.

Referring now to FIG. 10, with this derailleur calibration method, when a user depresses one of the switches 31a or 31b only once within the prescribed time period P1, while in the calibration mode, the a calibration command is sent form the controller 20 to operate the motor 60 to obtain a selected adjustment amount A1 in a selected adjustment direction. For example, if the rear derailleur downshift switch 31a is depressed just once, then the controller 20 detects this operation (one time and downshifting direction) and outputs a downshift adjusting signal to the rear derailleur 16 for activating the rear derailleur motor 60. The rear derailleur motor drive train 62 will then begin to move in the downshifting (first) direction by an adjustment indicating amount B1 in response to the calibration command. In this embodiment, the rear derailleur motor drive train 62 will initially move five steps (adjustment indicating amount B1) to an adjustment indicating position and then subsequently the rear derailleur motor drive train 62 will back four steps (e.g., a return amount C1) in the upshifting (second) direction to a target (selected) adjustment position as seen in FIG. 10. The rear derailleur 16 is now set on the target position and the previously stored table is updated and stored after a prescribed time period P2 (e.g. five seconds) has elapsed since one of the switches 31a or 31b was depressed by the user as seen in FIG. 12. Thus, the user can easily determine if an adjustment was made and the direction of the adjustment by driving the rear derailleur motor 60 for a longer period of time so that the user can see the chain guide 16d move and its direction of movement.

Referring now to FIG. 11, with this derailleur calibration method, when a user depresses one of the switches 31a or 31b only twice within the prescribed time period P1, while in the calibration mode, the a calibration command is sent form the controller 20 to operate the motor 60 to obtain a selected adjustment amount A2 in a selected adjustment direction. For example, if the rear derailleur downshift switch 31a is depressed twice within the prescribed time period P1, then the controller 20 detects this operation (two times and downshifting direction) and outputs a downshift adjusting signal to the rear derailleur 16 for activating the rear derailleur motor 60. The rear derailleur motor drive train 62 will then begin to move in the downshifting (first) direction by an adjustment indicating amount B2 in response to the calibration command. In this embodiment, the rear derailleur motor drive train 62 will initially move ten steps (adjustment indicating amount B2) to an adjustment indicating position and then subsequently the rear derailleur motor drive train 62 will back eight steps (e.g., a return amount C2) in the upshifting (second) direction to a target (selected) adjustment position as seen in FIG. 11. The rear derailleur 16 is now set on the target position and the previously stored table is updated and stored after the prescribed time period P2 has elapsed since one of the switches 31a or 31b was depressed by the user as seen in FIG. 12. Thus, by operating the switch 31a or 31b (input part) within the prescribed time period P1, the controller sets the selected adjustment amount of the calibration command based a number of times that the switch 31a or 31b was operated within the prescribed time period P1. Also the chain guide 16d of the rear derailleur 16 is moved different amounts for the adjustment indicating amount depending on the number of times that the switch 31a or 31b was operated within the prescribed time period P1.

The front derailleur 18 is calibrated in the same manner. Thus, the user can easily determine if an adjustment was made to the front derailleur 18 and the direction of the adjustment by driving the front derailleur motor 70 initially to move the front derailleur motor drive train 72 farther than the selected adjustment amount in one direction by an adjustment indicating amount in response to the calibration command, in which the adjustment indicating amount is greater than the selected adjustment amount of the calibration command, and then subsequently move the front derailleur motor drive train 72 in the opposite direction to the selected adjustment position.

Referring now to FIG. 12, with this derailleur calibration method, after the prescribed time period P2 (e.g. five seconds) has elapsed since one of the switches 31a, 31b, 33a or 33b was depressed by the user, the controller 20 executes a table updating routine. In step S1, the controller 20 detects value (voltage) of the analog position sensor 64 or 74 acting as a potentiometer, which indicates the current position (rotational angle) of the motor drive train 62 or 72. Then in step S2, the controller 20 compares the detected value (voltage) of the analog position sensor 64 or 74 acting as a potentiometer with the prestored reference value in the prestored table. If the detected value matches the prestored reference value, then the routine ends. However, if the detected value does not match the prestored reference value, then the routine proceeds to step S3. In step S3, the controller 20 overwrites the prior data and updates the table in accordance with the detected value (voltage) of the analog position sensor 64 or 74 acting as a potentiometer.

Figure 13:
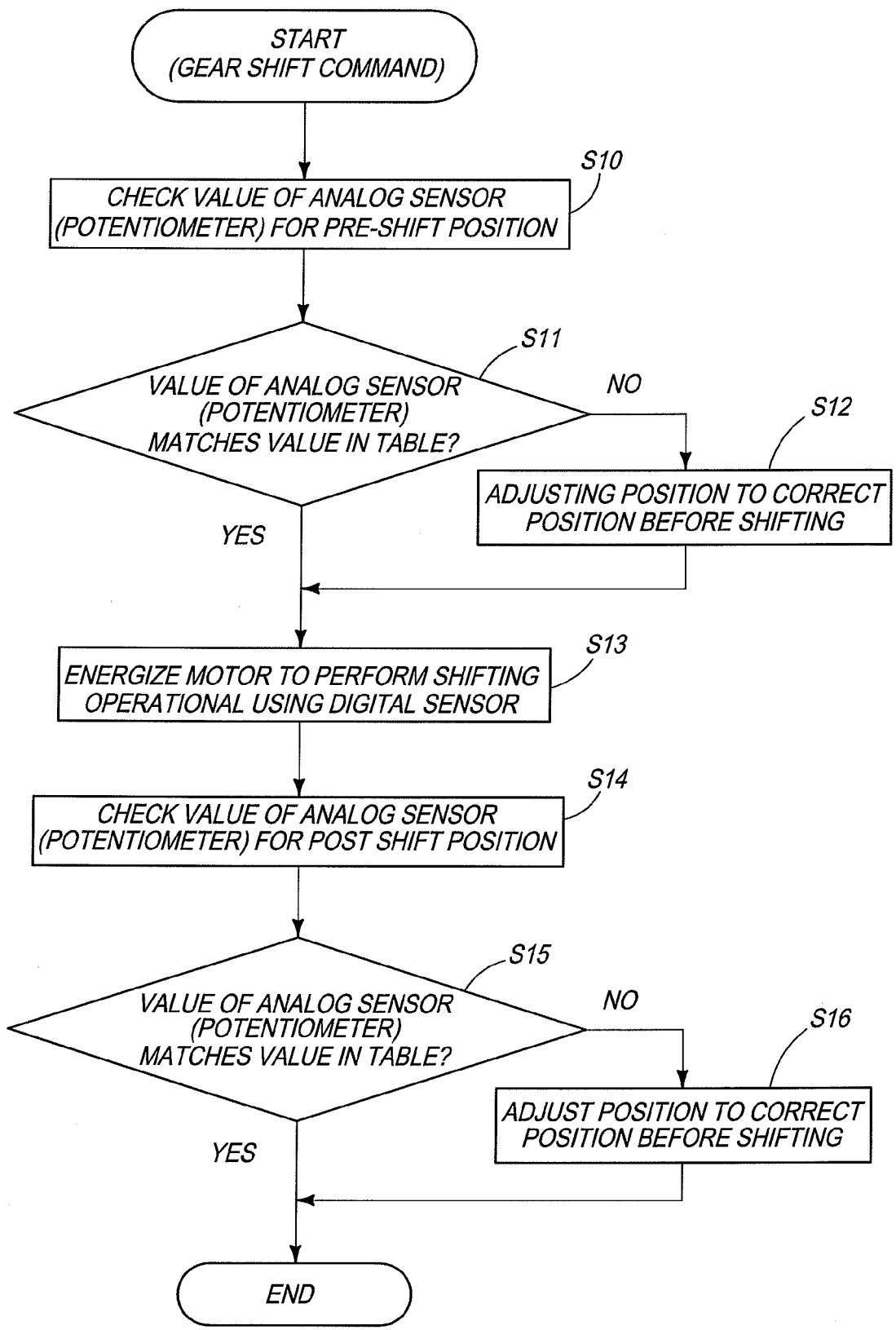
FIG. 13 is a flow chart illustrating the process executed by the controller to correct the position of the chain guide of the derailleur in response to a gear shift command.
Figure 14:
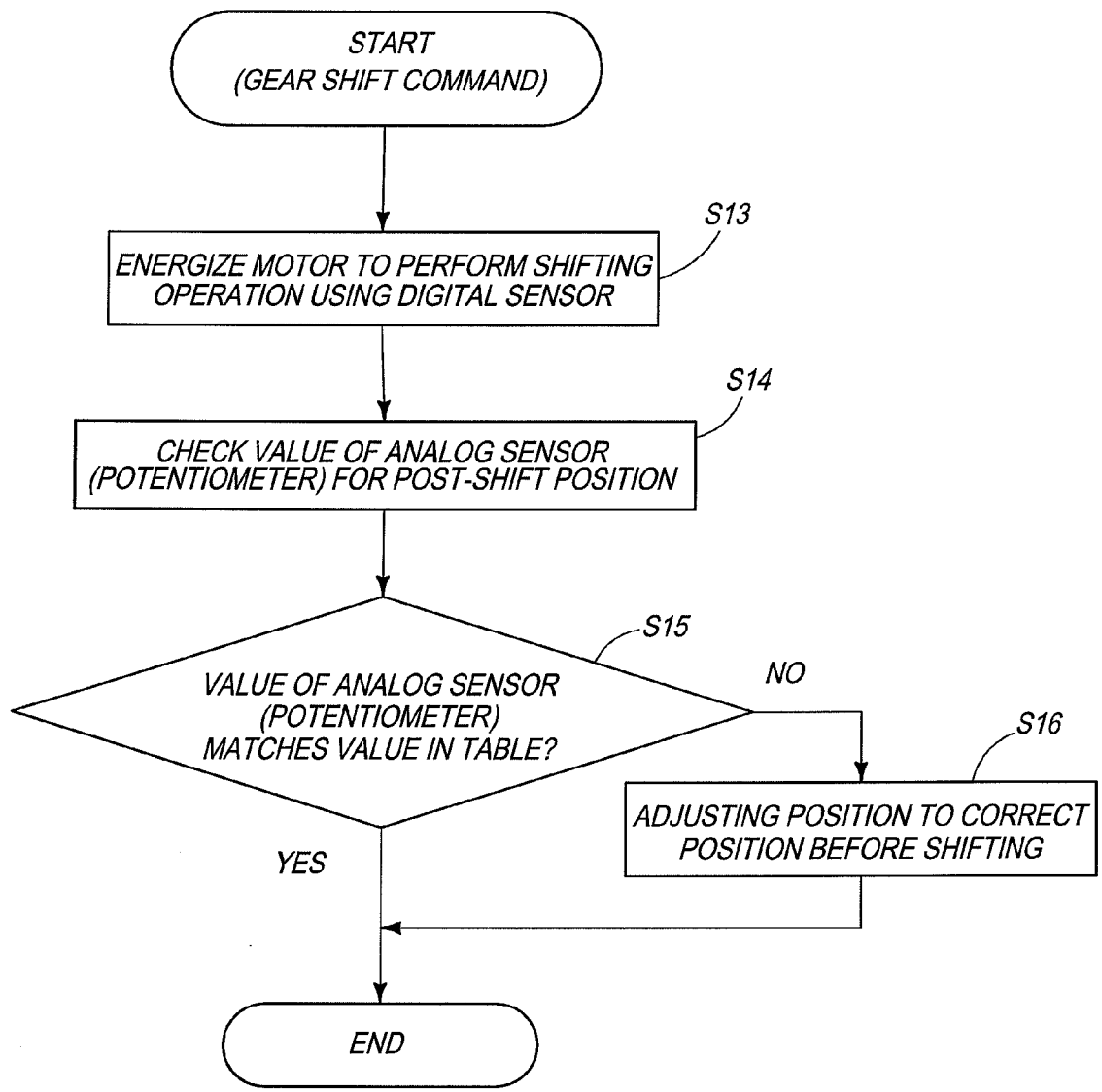
FIG. 14 is a flow chart illustrating an alternate process executed by the controller to correct the position of the chain guide of the derailleur in response to a gear shift command.
Figure 15:
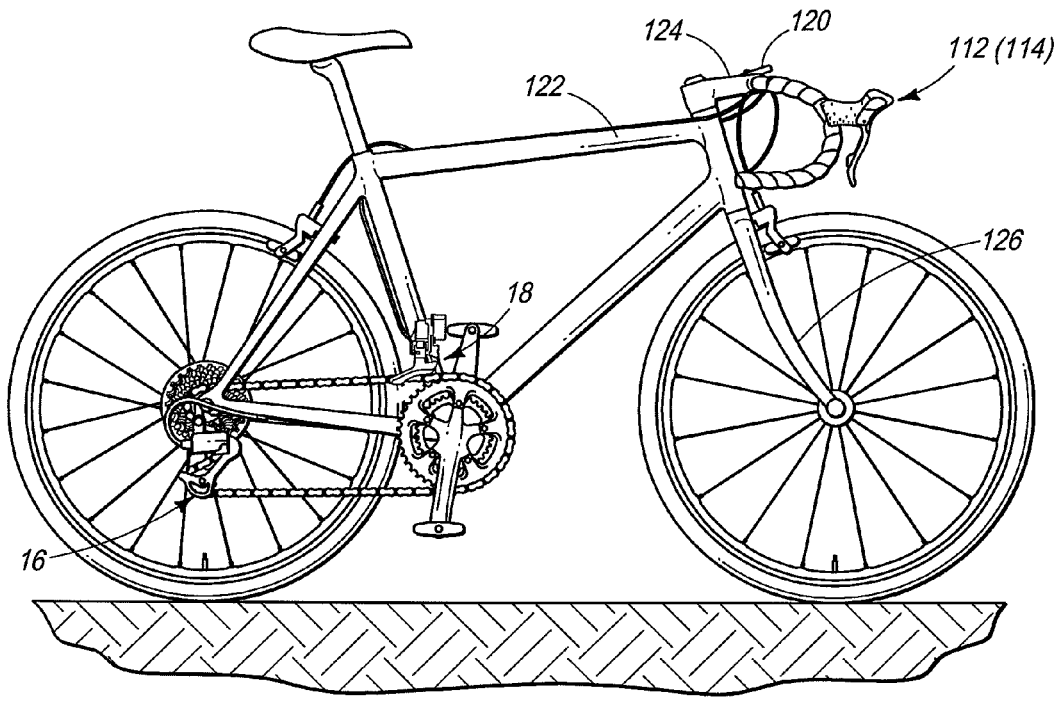
FIG. 15 is a side elevational view of a bicycle (road bike) that is equipped with the motorized front and rear derailleurs of FIGS. 3 and 4 and a pair of control devices in accordance with a second embodiment.
Figure 16:
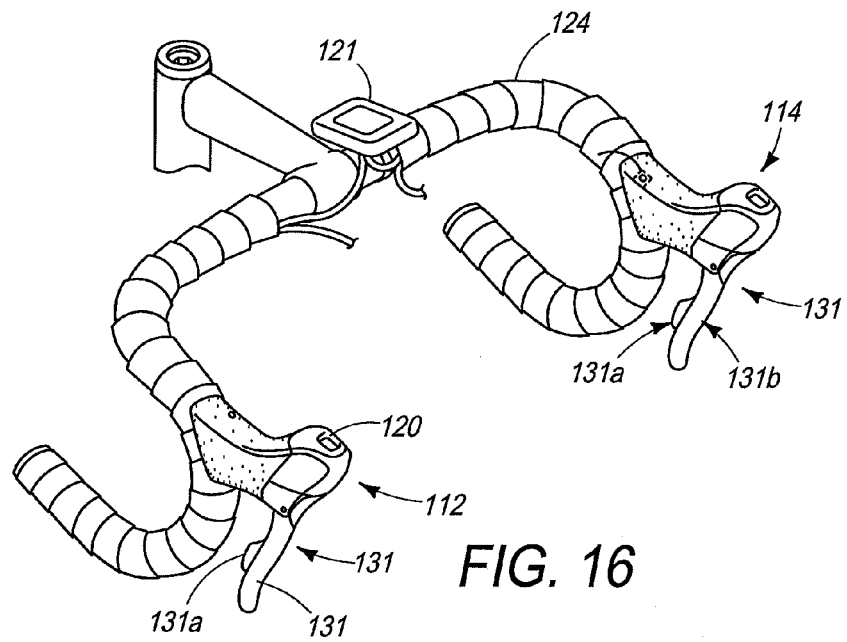
FIG. 16 is a perspective view of the handlebar area of the bicycle illustrated in FIG. 15, with the control devices mounted to a drop down type of handlebar in accordance with the second embodiment.
Figure 17:
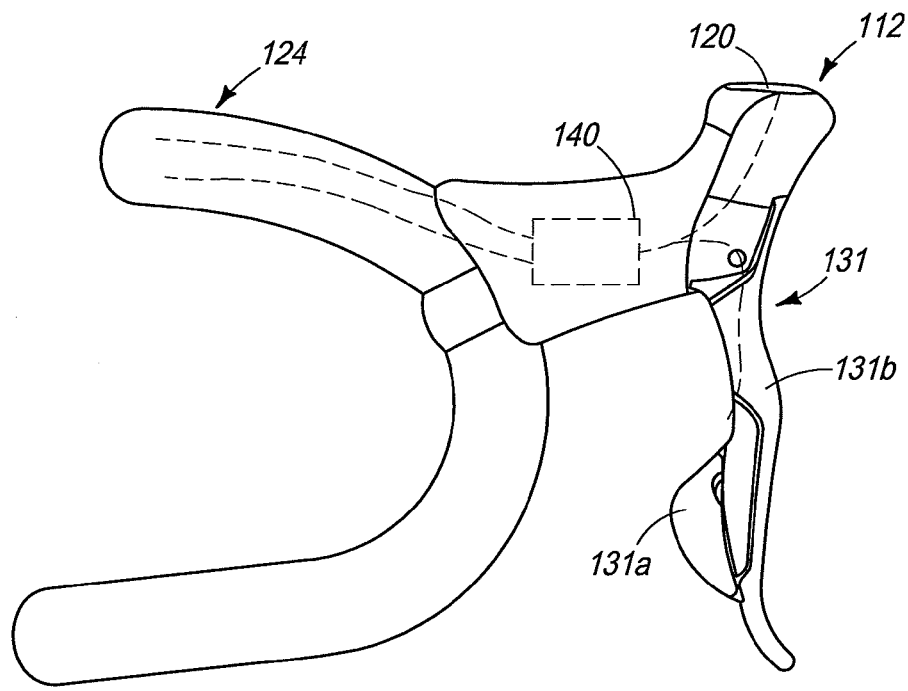
FIG. 17 is an inside elevational view of one of the bicycle control (brake/shift) devices illustrated in FIGS. 1 and 2 in accordance with the second embodiment.
Figure 18:
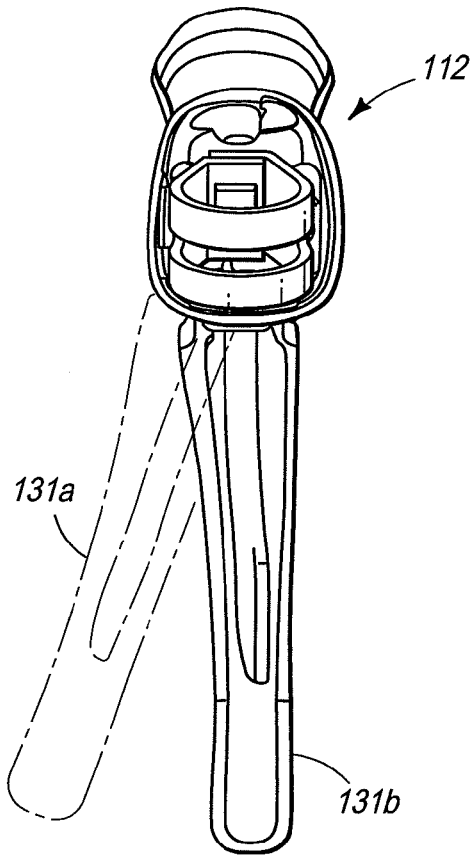
FIG. 18 is a rear elevational view of the bicycle control (brake/shift) device illustrated in FIG. 17 with the shifting position of the brake lever shown in phantom lines.
Figure 19:
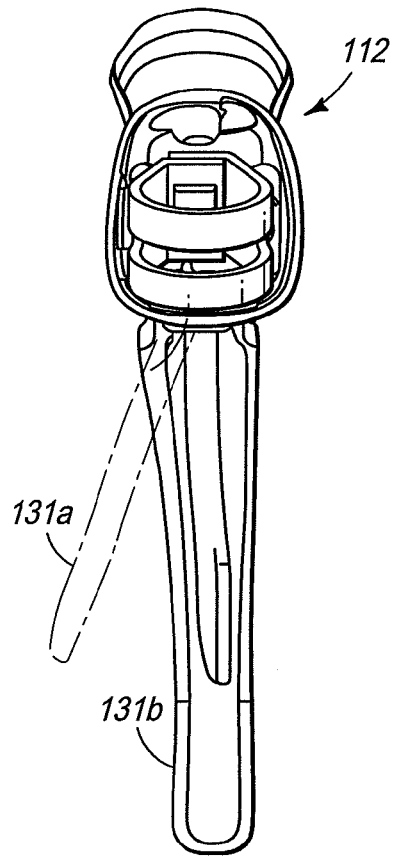
FIG. 19 is a rear elevational view of the bicycle control (brake/shift) device illustrated in FIG. 17 with the shifting position of the shift lever shown in phantom lines.

As seen in FIGS. 13 and 14, a first position correcting routine is illustrated in FIG. 13 and a second correcting routine is illustrated in FIG. 13. Either both of the derailleurs 16 and 18 uses one of the position correcting routines, or alternatively, one of the derailleurs 16 and 18 uses one of the position correcting routines and the other one of derailleurs 16 and 18 uses the other of the position correcting routines. The routine of FIG. 13 is preferable for the front derailleur 18, while the routine of FIG. 14 is preferable for the rear derailleur 16. In this embodiment, the controller 20 uses the analog position sensor 64 or 74 acting as a potentiometer to detect an absolute value of position of derailleur (the positioning angle of the motor drive train) at starting position and/or a stopping position, and then, the controller 20 controls the motor drive train 62 or 72 to shift the chain cage 16d or 18d to a correct position in accordance with correlation of an absolute value, a value of positioning angle and a value of rotating direction.

Referring now to FIG. 13, with the electronic shifting system of the illustrated embodiment, if the motor drive train 62 or 72 is out of alignment with the current prestored table due to some external force (e.g., the chin guide being hit), then the controller 20 can automatically correct the current position during riding (operating) each time a shifting operation occurs. In particular, each time a shifting operation occurs by depressing one of the switches 31a, 31b, 33a or 33b, the controller 20 receives a gear shift command or signal therefrom, and executes a position correcting routine as seen in FIG. 13. Thus, the position correcting routine of FIG. 13 is executed each time a gear shift command is received.

In step S10, basically, when the derailleur 16 or 18 does not move (not during shifting), the controller 20 uses the analog position sensor 64 or 74 acting as a potentiometer to check the position of the derailleur 16 or 18 (e.g., the position of the motor drive train 62 or 72). Thus, after the controller 20 obtains the detected value (voltage) of the analog position sensor 64 or 74, which indicates the current position of the derailleur, the routine proceeds to step S11.

In step S11, prior to shifting, the controller 20 compares the detected value (voltage) of the analog position sensor 64 or 74 acting as a potentiometer with the prestored reference value in the prestored table. If the detected value does not match the prestored reference value, then the routine proceeds to step S12. However, if the detected value matches the prestored reference value, then the routine proceeds to step S13.

In step S12, since the position of the derailleur 16 or 18 is incorrect, the controller 20 operates the motor 60 or 70 to adjust the position of the derailleur 16 or 18 to correct position before shifting based on the prestored reference value in the prestored table. After adjusting the position of the derailleur 16 or 18 to the correct position, the routine proceeds to step S13.

In step S13, the controller 20 operates the motor 60 or 70 to perform the shifting operation based on the gear shift command that is produced by depressing one of the switches 31a, 31b, 33a or 33b. During shifting, the digital position sensor 66 or 76 checks the values of the positioning angle and the rotating direction of the motor drive train 62 or 72 to operate the motor 60 or 70 to position the chain guide 16d or 18d. After completing the shifting operation, the routine proceeds to step S14.

In step S14, after shifting, when the derailleur 16 or 18 does not move (not during shifting), the controller 20 uses the analog position sensor 64 or 74 acting as a potentiometer to again check the position of the derailleur 16 or 18 (e.g., the position of the motor drive train 62 or 72). Thus, after the controller 20 obtains the detected value (voltage) of the analog position sensor 64 or 74, which indicates the current position of the derailleur, the routine proceeds to step S15.

In step S15, after shifting, the controller 20 compares the detected value (voltage) of the analog position sensor 64 or 74 acting as a potentiometer with the prestored reference value in the prestored table. If the detected value does not match the prestored reference value, then the routine proceeds to step S16. However, if the detected value matches the prestored reference value, then the routine ends.

Alternatively, as seen in FIG. 14, the controller 20 can run an alternate routine in which the position of the derailleur 16 or 18 is only adjusted after shifting. In particular, as seen in FIG. 14, each time a gear shift command is received, the controller 20 can immediately perform the shifting operation and then subsequently perform the steps S14 to S16 as discussed above.

Referring now to FIGS. 15 to 19, a bicycle 110 is illustrated that is equipped with an electronic shifting system in accordance with a second embodiment. Basically, the electronic shifting system of this second embodiment is identical to the first embodiment, except that the electronic shifting system is used with a road bike and the control devices 12 and 14 have been replaced with control devices 112 and 114. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The bicycle 110 is a "road racer" (racing style road bike) that includes, among other parts, a frame 122, a handlebar 124 and a front fork 126. The handlebar 24 is mounted to an upper end of the front fork 126 in a conventional manner. The handlebar 124 has the control devices 112 and 114 mounted to opposite ends. The rear derailleur 16 of the first embodiment is mounted to a rear portion of a chain stay of the frame 122 in a conventional manner. The front derailleur 18 of the first embodiment is mounted on a seat tube of the frame 22 in a conventional manner.

The bicycle control devices 112 and 114 are road brifters that are used with the drop down handlebar 124. Here, a display unit 120 and an electronic controller 140 are provided within a body portion of the control device 112, with the other control device 114 electrically connected to the electronic controller 140. The bicycle control devices 112 and 114 are essentially identical in construction and operation, except that they are mirror images and the control device 112 includes the electronic controller 140. Thus, only the bicycle control device 14 will be discussed and illustrated herein.

Moreover, in this embodiment, the control device 112 has a pair of shift levers 131a and 131b for upshifting and downshifting and a mode switch 131c for changing the shift levers 131a and 131b from a shifting mode to a calibration mode to calibrate the gear positions of the rear derailleur 16. Similarly, the control device 114 has a pair of shift levers 133a and 133b for upshifting and downshifting and a mode switch 133c for changing the shift levers 133a and 133b from a shifting mode to a calibration mode to calibrate the gear positions of the front derailleur 18. Thus, the shift levers 131a, 131b, 133a and 133b are used to carry out the calibration method and the position correcting method in the same manner as the switches 31a, 31b, 33a and 33b of the first embodiment. Thus, this second embodiment will not be described in further detail herein.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component position correcting device comprising:
    a first sensor configured and arranged to detect a current absolute value of a positioning angle of a movable part of a bicycle component;
    a second sensor configured and arranged to detect both a movement direction of the movable part and an amount of movement of the movable part;
    a comparison unit configured and arranged to compare the current absolute value of the positioning angle of the movable part to a prestored reference value of the positioning angle of the movable part in response to a component operation command; and
    a position adjuster configured and arranged to selectively operate the movable part to adjust the positioning angle of the movable part to the prestored reference value of the positioning angle of the movable part based on a detected result of the first sensor upon determining the current absolute value of the positioning angle of the movable part does not match the prestored reference value of the positioning angle of the movable part in response to the component operation command, the position adjuster being further configured and arranged to shift the movable part based on a detected result of the second sensor in response to the component operation command.

2. The bicycle component position correcting device according to claim 1, wherein
    the first sensor includes an analog sensor that detects the current absolute value of the positioning angle of the movable part.

3. The bicycle component position correcting device according to claim 2, wherein the analog sensor includes a potentiometer that detects the current absolute value of the positioning angle of the movable part.

4. The bicycle component position correcting device according to claim 1, wherein
the second sensor includes a digital sensor that detects the movement direction of the movable part and the amount of movement of the movable part.

5. The bicycle component position correcting device according to claim 4, wherein
the digital sensor includes a shutter wheel and a photo interrupter that detect the movement direction of the movable part and the amount of movement of the movable part.

6. The bicycle component position correcting device according to claim 1, wherein
the first sensor includes an analog sensor having a potentiometer that detects the current absolute value of the positioning angle of the movable part; and
the second sensor includes a digital sensor having a shutter wheel and a photo interrupter that detect the movement direction of the movable part and the amount of movement of the movable part.

7. A bicycle derailleur including the bicycle component position correcting device according to claim 1, wherein
the bicycle derailleur includes a mounting member, a movable member, a connecting mechanism movably connecting the movable member to the mounting member, and a chain guide connected to the movable member, with an electric drive unit operatively coupled to the connecting mechanism.

8. The bicycle derailleur according to claim 7, wherein
the movable part is a part of a motor drive train of the electric drive unit.

9. The bicycle derailleur according to claim 7, wherein
the first sensor includes an analog sensor that detects the current absolute value of the positioning angle of the movable part.

10. The bicycle derailleur according to claim 9, wherein
the analog sensor includes a potentiometer that detects the current absolute value of the positioning angle of the movable part.

11. The bicycle derailleur according to claim 7, wherein
the second sensor includes a digital sensor that detects the movement direction of the movable part and the amount of movement of the movable part.

12. The bicycle derailleur according to claim 11, wherein
the digital sensor includes a shutter wheel and a photo interrupter that detect the movement direction of the movable part and the amount of movement of the movable part.

13. The bicycle derailleur according to claim 7, wherein
the first sensor includes an analog sensor having a potentiometer that detects the current absolute value of the positioning angle of the movable part; and
the second sensor includes a digital sensor having a shutter wheel and a photo interrupter that detect the movement direction of the movable part and the amount of movement of the movable part.

14. The bicycle component position correcting device according to claim 1, wherein
the position adjuster is further configured and arranged to operate the movable part to adjust the positioning angle of the movable part to the prestored reference value of the positioning angle of the movable part while maintaining a current gear of a bicycle.

\* \* \* \* \*